(12) United States Patent
Yuki

(10) Patent No.: US 6,437,871 B1
(45) Date of Patent: *Aug. 20, 2002

(54) FACSIMILE APPARATUS WITH FUNCTION FOR COMMUNICATION WITH PLURAL PARTNERS USING PUBLIC SWITCHED TELEPHONE NETWORK ADAPTOR, LOCAL AREA NETWORK ADAPTOR AND INTEGRATED SERVICES DIGITAL NETWORK ADAPTOR

(75) Inventor: Akira Yuki, Fukuoka-ken (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,094

(22) Filed: Nov. 6, 1997

(30) Foreign Application Priority Data

Nov. 11, 1996 (JP) .............................................. 8-298307

(51) Int. Cl.⁷ ............................ G06F 13/00; H04N 1/00; H04N 1/32

(52) U.S. Cl. ...................... 358/1.15; 358/434; 358/440; 358/442

(58) Field of Search ......................... 358/434, 435–440, 358/442, 444, 404, 402, 468, 407; 379/17, 18, 16, 93.09, 100.15, 100.01, 243, 258, 114

(56) References Cited

U.S. PATENT DOCUMENTS

| | | | | |
|---|---|---|---|---|
| 4,754,335 A | * | 6/1988 | Izawa et al. ................ 358/256 |
| 5,189,527 A | * | 2/1993 | Matsuda et al. ............ 358/440 |
| 5,384,835 A | * | 1/1995 | Wheeler et al. ............... 379/96 |
| 5,420,852 A | * | 5/1995 | Anderson et al. .......... 370/58.1 |
| 5,521,719 A | * | 5/1996 | Yamada ....................... 358/438 |
| 5,546,450 A | * | 8/1996 | Suthard et al. ............. 379/207 |
| 5,586,121 A | * | 12/1996 | Moura et al. ............... 370/404 |
| 5,751,971 A | * | 5/1998 | Dobbins et al. ....... 395/200.68 |
| 5,793,498 A | * | 8/1998 | Scholl et al. ................ 358/434 |
| 5,828,666 A | * | 10/1998 | Focsaneanu et al. ........ 370/389 |
| 5,835,696 A | * | 11/1998 | Hess ..................... 395/182.08 |
| 5,841,841 A | * | 11/1998 | Dodds et al. ............ 379/93.08 |
| 5,862,203 A | * | 1/1999 | Wulkan et al. ............. 379/114 |
| 5,870,549 A | * | 2/1999 | Bobo, II ................ 395/200.36 |
| 6,016,307 A | * | 1/2000 | Kaplan et al. .............. 370/238 |
| 6,069,890 A | * | 5/2000 | White et al. ................. 370/352 |
| 6,157,463 A | * | 12/2000 | Kitagawa .................... 358/400 |

FOREIGN PATENT DOCUMENTS

| | | |
|---|---|---|
| JP | 7095312 | 4/1995 |
| JP | 7273903 | 10/1995 |

* cited by examiner

Primary Examiner—Madeleine Nguyen
(74) Attorney, Agent, or Firm—Stevens, Davis, Miller & Mosher, LLP (57) ABSTRACT

A facsimile apparatus communicates with plural partners using adaptors for communication networks such as an ISDN, a LAN, or the PSTN. Both telephone number and IP address information are stored as transmission partner information for abbreviated dialing. At the time of transmission, by specifying only one of the telephone number and the IP address information, the lowest cost line can be selected automatically in accordance with the prevailing conditions, so that image data can be transmitted and received through the line. If communication fails through the first selected line for a prescribed number of times, the communication path is switched to another line automatically, and transmission is tried again, thereby ensuring the transmission.

4 Claims, 8 Drawing Sheets

| MEMORY AREA NO | DESTINATION NAME | TELEPHONE NUMBER | ISDN | IP ADDRESS | GROUP IP ADDRESS | COMMUNICATION COST DATA | SERVICE INFORMATION |
|---|---|---|---|---|---|---|---|
| 1 | MR.△△,THE HEAD OF DEPARTMENT | 000−0000 | ON | 189.28.4.15 | 189.28.5.20 | | |
| 2 | MR.▽ | 012−3456 | OFF | 198.38.8.25 | | | |
| 3 | MR.○○,THE HEAD OF SECTION | 987−6543 | OFF | 179.12.4.32 | 189.28.5.20 | | |
| 4 | MR.××,THE SUBSECTION CHIEF | 654−3219 | ON | 187.35.8.22 | 189.28.5.20 | | |
| 5 | COMPANY △△ | 102−3040 | OFF | | | | |
| 6 | COMPANY □□ | 345−6789 | ON | | | | |
| | | | | | | | |

FACSIMILE APPARATUS WITH FUNCTION FOR COMMUNICATION WITH PLURAL PARTNERS USING PUBLIC SWITCHED TELEPHONE NETWORK ADAPTOR, LOCAL AREA NETWORK ADAPTOR AND INTEGRATED SERVICES DIGITAL NETWORK ADAPTOR

BACKGROUND OF THE INVENTION

The present invention relates to a facsimile apparatus for communication of image signals.

Generally, LANs, ISDNs, public lines, etc. have been used as communication means for facsimile apparatus. Conventionally, a user has made contracts with a plurality of telephone companies, and, of these companies, the user has chosen the type of line which requires the cheapest communication cost.

However, in the case where a user could make a contract with only one telephone company so that the user could not use any line other than the line the company provides, even if a communication means for the line did not succeed in trying communication prescribed times by the user, it was impossible for the user to choose any other cheaper means to further try the communication.

Further, when a user wishes to transmit image signal data to a plurality of partners in one operation, it is necessary for the user to specify a partner for every communication means or every line. For example, in the case where one partner can make communication through a general public telephone line and through a LAN while another partner can make communication only through the general public telephone line, the user should specify the general public telephone line to transmit image signal data to both the partners at one operation. Thus, in such a case, there was a problem that the user could not use the LAN effectively.

Taking the foregoing conventional problem into consideration, it is an object of the present invention to provide a facsimile apparatus in which not only it is possible to automatically choose a communication means requiring the cheapest communication cost, by a simple operation by using LANs as well as general public lines and ISDNs, but also it is possible to automatically choose the second cheapest communication means if the communication cannot be carried out through the cheapest communication means, and, at the same time, it is possible to avoid complicated setting-up every time communication is carried out.

SUMMARY OF THE INVENTION

In order to achieve the above object, according to a first aspect of the present invention, there is provided a facsimile apparatus comprising at least two of a PSTN (public switched telephone network) adaptor means for transmitting and receiving data through general public telephone lines, an ISDN adaptor means for transmitting and receiving data through ISDN lines, and an LANs adaptor means for transmitting and receiving data through a LAN, the facsimile apparatus further comprising: a data input means for inputting destination data of respective communication partners; a memory means for storing the destinations inputted by the data input means; a scanner means for inputting image data of a copy; a data compressing means for compressing the image data taken in by the scanner means; and a first control means for making the memory means store the respective destination data in the form of being associated with each other if a partner has two or more communication means when the destination data are inputted, calculating the communication cost in communicating through the respective communication means if a partner to which communication is to be sent is given by a user when the user perform communication, selecting a communication means of the cheapest communication cost, and transmitting the compressed image data. By such a configuration, the communication means of the cheapest communication cost can be automatically selected by a simple operation not only by using a general public telephone line and ISDN but also by using a LAN, and when the communication can not be performed by the communication means. The second cheapest communication means is automatically selected to thereby perform the communication.

According to a second aspect of the present invention, provided is a facsimile apparatus comprising at least one of a PSTN adaptor means for transmitting and receiving data through general public telephone lines, and an ISDN adaptor means for transmitting and receiving data through ISDN lines, the facsimile apparatus further comprising: a data input means for inputting destination data of respective communication partners; a memory means for storing the destinations inputted by the data input means; a scanner means for inputting image data of a copy; a data compressing means for compressing the image data taken in by the scanner means; a selecting means for selecting a portion of the memory means for storing the destination data therein or reading out the destination data therefrom; a first control means for making the selecting means select a one-touch dial memory area for storing the destination data, and making the memory means store two or more partners and the communication means associated with the partners by means of the input means; and a third control means for, if partners to which communication is to be sent are specified by the selecting means and when the specified partners are those registered as belonging to one and the same specific group on a LAN, automatically extracting not individual information of the individual partners but an IP address of the group, and transmitting the compressed image data to the group IP address. In such a configuration, one and the same image data can be sent by one operation to a plurality of partners of different groups or a plurality of partners in one and the same group so that the communication cost and communication time can be saved.

According to a third aspect of the present invention, provided is a facsimile apparatus comprising at least one of a PSTN adaptor means for transmitting and receiving data through general public telephone lines, and an ISDN adaptor means for transmitting and receiving data through ISDN lines, the facsimile apparatus further comprising: a LAN adaptor means for transmitting and receiving data through a LAN; a data input means for inputting destination data of respective communication partners; a memory means for storing the destinations inputted by the data input means; a selecting means for selecting a portion of the memory means for storing the destination data therein or reading out the destination data therefrom; a fourth control means for making the selecting means select a one-touch dial memory area for storing the destination data, and making the memory means store two or more partners and the communication means associated with the partners, and store services of partners known in advance in the form of being associated with the destination data; and a fifth control means for, if a partner to which communication is to be sent is specified by the selecting means, requesting the services registered by the service storage means from the partner. In such a configuration, it is not necessary to perform complicated service setting every time communication is made and the communication can be made by one operation.

DETAILED DESCRIPTION OF THE PREFERRED EMBODIMENTS

Embodiments of the present invention will be described below with reference to the drawings.

Embodiment 1

Figure 1:
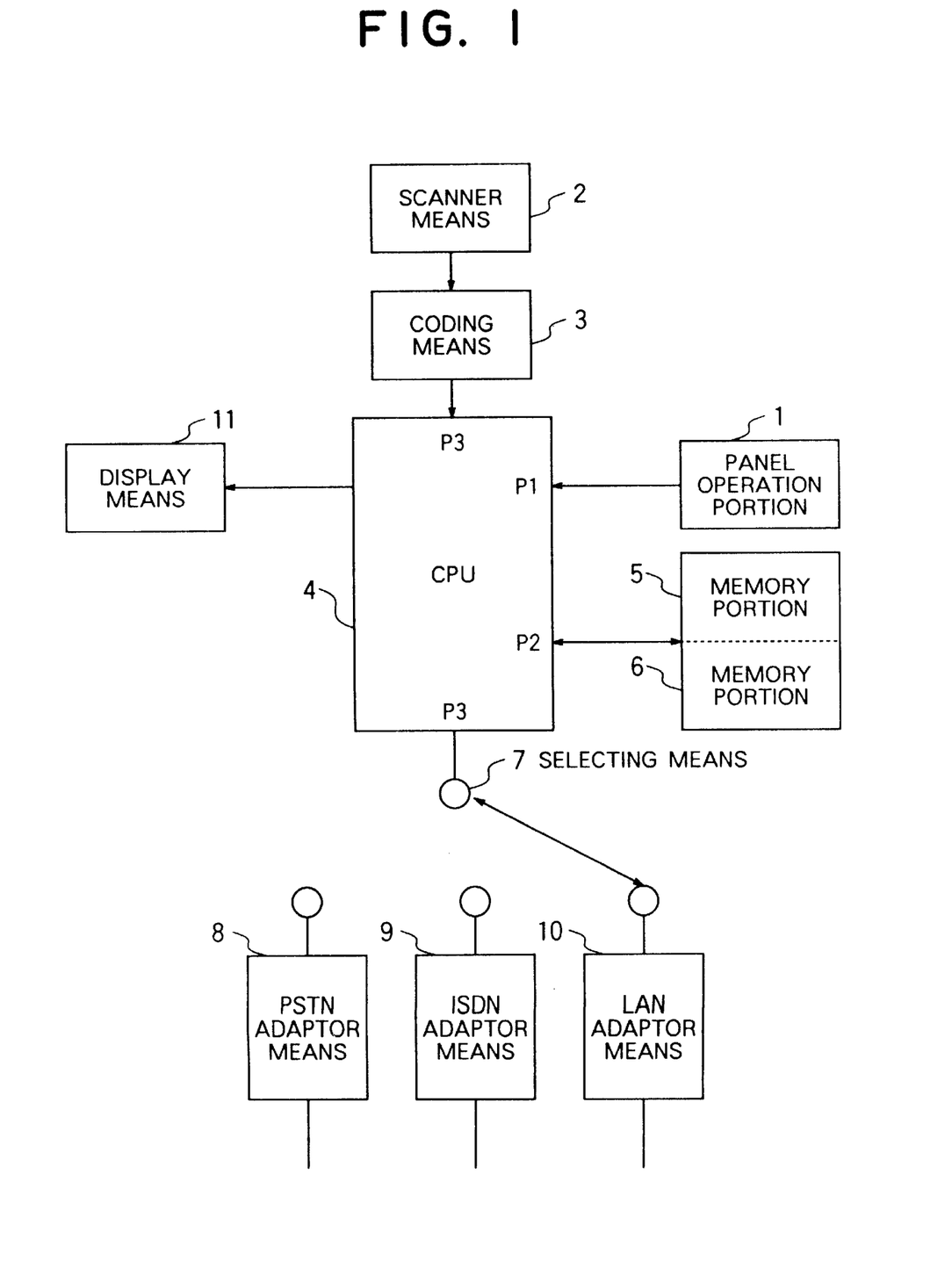
FIG. 1 is a block diagram illustrating the configuration of a first embodiment of the facsimile apparatus according to the present invention.
Figure 2:
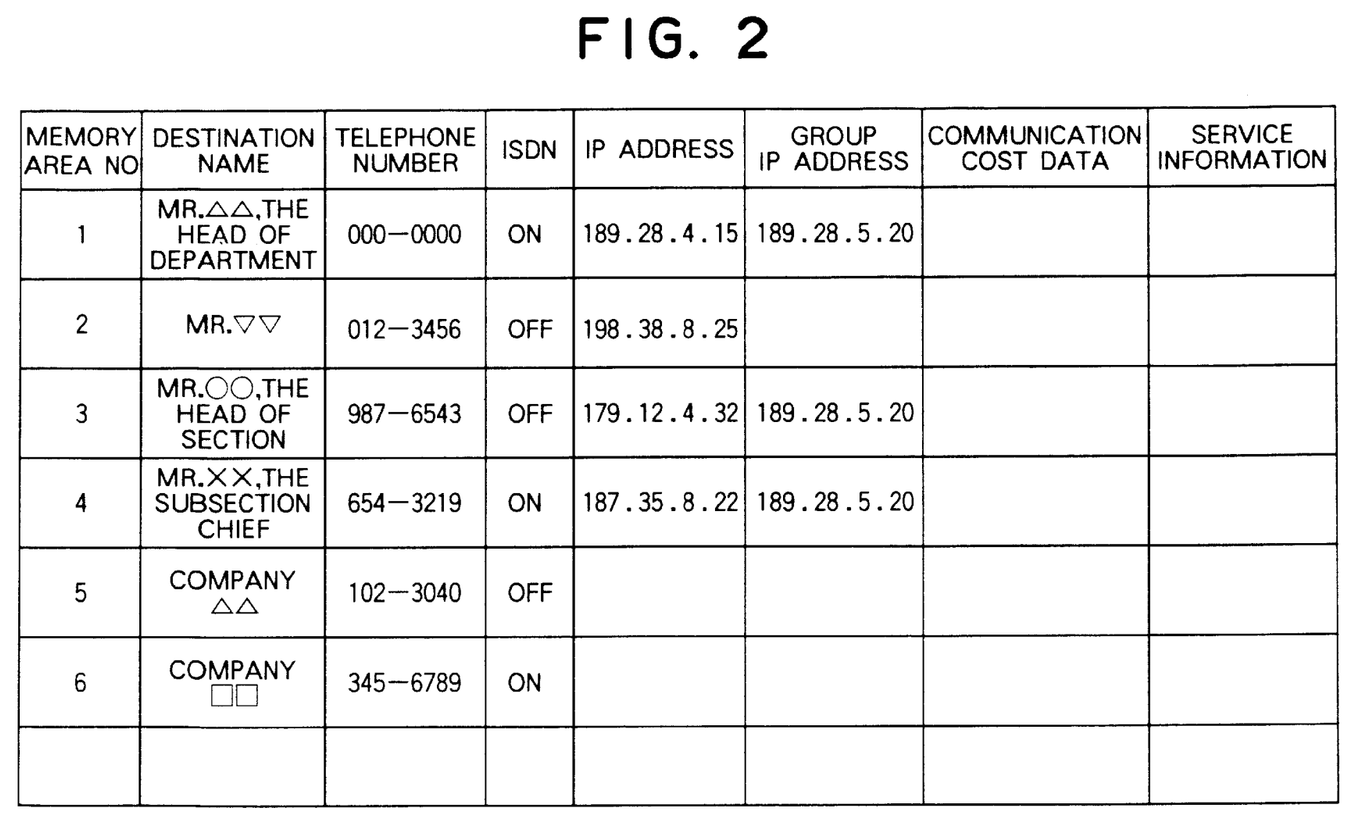
FIG. 2 is a diagram showing an example of the registration state of a one-touch dial memory in the first embodiment of the facsimile apparatus according to the present invention.

FIG. 1 is a block diagram illustrating the configuration of a first embodiment of the facsimile apparatus according to the present invention; FIG. 2 is a diagram showing an example of the registration state of a one-touch dial memory of the facsimile apparatus in the first embodiment; and FIGS. 3 to 8 are flow charts respectively showing the control operation of the facsimile apparatus.

In FIG. 1, the reference numeral 1 represents a panel operation portion for giving commands for storing or reading out the telephone numbers of destinations or the IP addresses of a LAN. The reference numeral 2 represents a scanner means for reading information of a copy. The reference numeral 3 represents a coding means for coding image data read by the scanner means 2. The reference numeral 4 represents a CPU for performing control throughout.

The reference numeral 5 represents a one-tough dial memory portion for storing the telephone numbers of destinations, the IP addresses of a LAN, the data of communication service or the communication cost. The reference numeral 6 represents a memory portion for storing the coded image data. FIG. 2 shows an example of the data stored in the one-touch dial memory portion 5. Each memory area of the one-touch dial memory portion 5 is separated into area portions for storing the name of a destination, the telephone number of the destination, the information showing whether the destination can connect with ISDN or not, the IP address of LAN, the group IP address of LAN, the data of communication cost on the basis of which the communication cost is determined, and the service information to which various services are registered.

The reference numeral 7 represents a selecting means for switching a communication means. The reference numeral 8 represents a PSTN adaptor means for performing communication through a general public line. The reference numeral 9 represents an ISDN adaptor means for performing communication through a digital line. The reference numeral 10 represents an LAN adaptor means for performing communication through LAN. The reference numeral 11 represents a display means for displaying a telephone number and various information.

Next, the operation of the facsimile apparatus constituted by the above-mentioned constituents will be described with reference to FIGS. 3 to 7.

Figure 3:
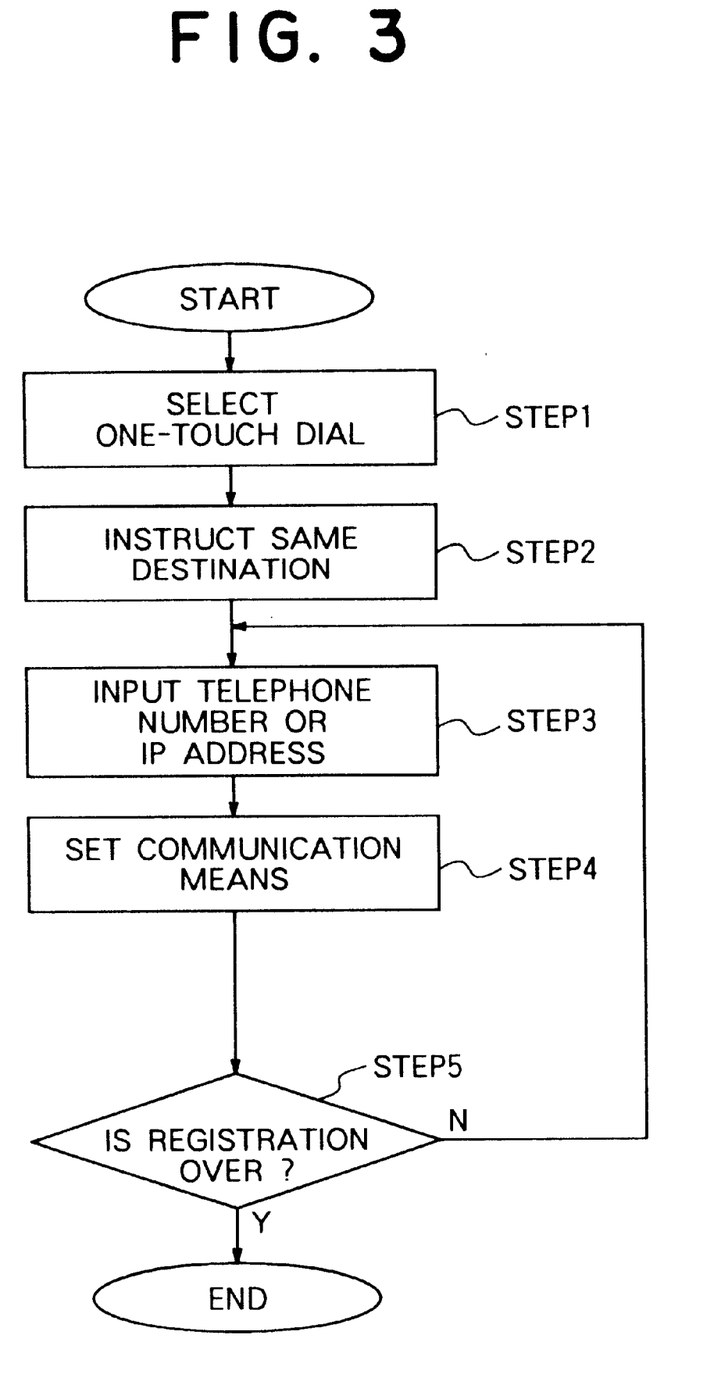
FIG. 3 is a flow chart showing the control operation of the facsimile apparatus.

As shown in FIG. 3, the CPU 4 specifies a one-touch dial memory area to store destination data through the panel operation portion 1 in advance (step 1) so that the data operated by the panel operation portion 1 and supplied through a terminal P1 are stored in the specified one-touch dial memory area.

Further, an instruction is given to indicate that the telephone number and the IP address of LAN which are now supplied through the panel operation portion 1 belong to one and the same destination (step 2).

After that, the user operates the panel operation portion 1 to input the destination data such as the destination telephone number, the IP address, etc. (step 3). Next, the user inputs a code indicating what communication means is suitable to the destination data which have been inputted, that is, a code indicating the suitable communication means is a general public line, ISDN, LAN, or the like. The CPU 4 sends these destination data to the one-touch dial memory portion 5 through a terminal P2 so that these destination data are stored in the one-touch dial memory portion 5 (step 4).

The steps 3 and 4 are repeated till all the communication means for the destinations are registered, and then the registration is completed (step 5).

Figure 4:
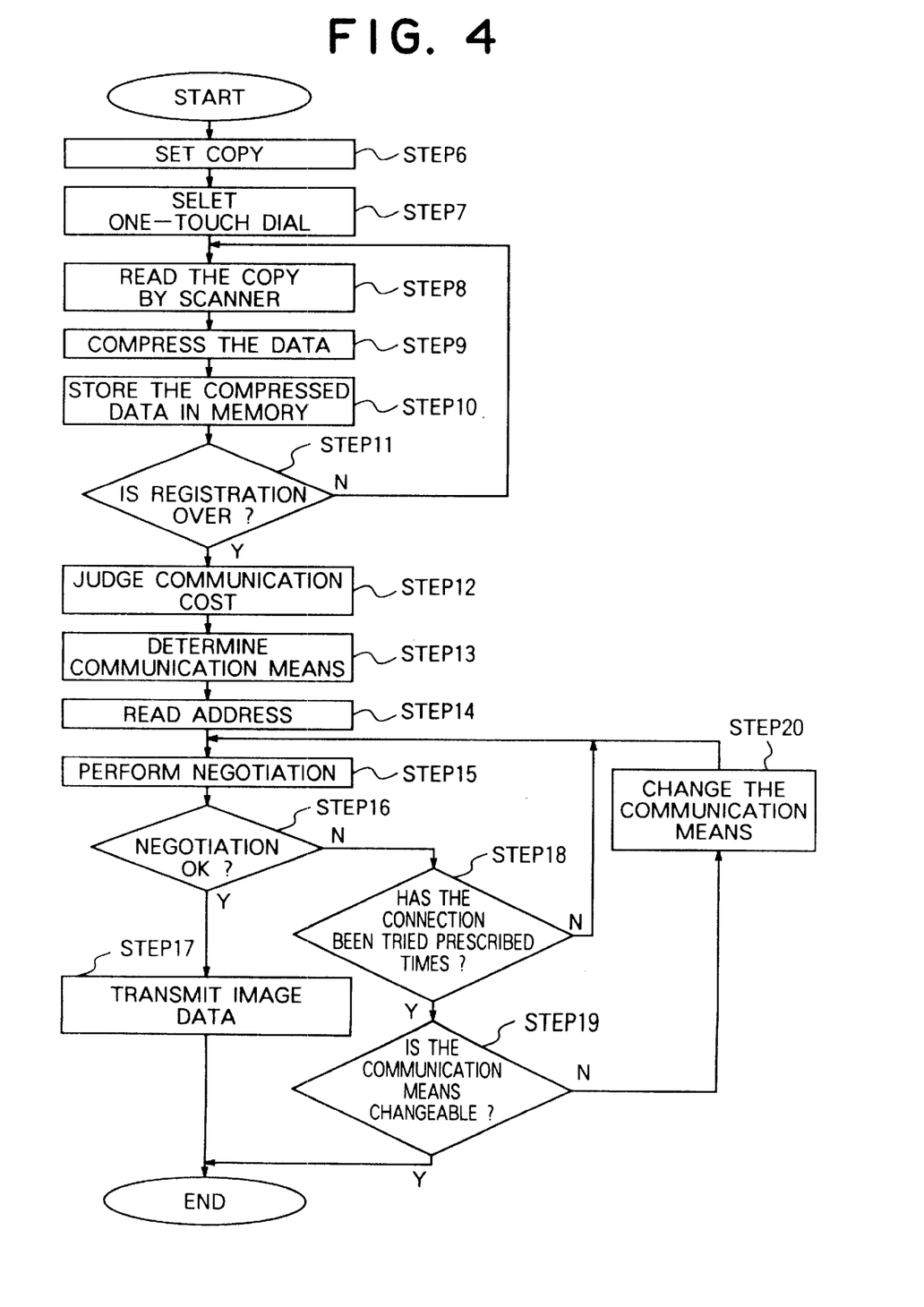
FIG. 4 is a flow chart showing the control operation of the facsimile apparatus.

Next, the user sets a copy to be sent in the scanner means 2. As shown in FIG. 4, when it is detected that the copy has been set in the scanner means 2 (step 6), the telephone numbers or LAN IP addresses, and the information such as the destination names accompanying those telephone numbers or LAN IP addresses, which have been stored in the steps 1 to 5 in advance, are read from the one-touch dial memory portion 5, and displayed on the display means 11. When the user operates the panel operation portion 1 and specifies one of the destinations to which the copy is to be sent (step 7), the copy reading operation is then started.

In the copy reading operation, first, a first sheet of the copy set in the scanner means 2 is fed so that image data are read therefrom (step 8), the image data are compressed and coded by means of the coding means 3 (step 9), and then the coded data are stored in the memory portion 6 (step 10). If the copy has a plurality of pages, the next sheet is fed and image data is read out in the same manner as described above (step 8), the image data are compressed and coded (step 9), and then stored in the memory portion 6 (step 10). These processes are repeated in accordance with the number of pages of the copy to be sent (step 11).

Then, a communication means to be used is selected on the basis of the data of communication cost stored in the one-touch dial memory portion 5. A plurality of communication means may be available in accordance with a destination. In this case, the cheapest communication means is judged (step 12). On the assumption that LAN is selected here by way of example, the communication path is connected to the communication means selected by the selecting means 7 (step 13).

Thereafter, the IP address of the communication destination selected in the step 7 is read from the one-touch dial memory portion 5 (step 14). While the communication with the destination is tried along the communication protocol in accordance with the selected communication means, communication conditions and so on to be carried out are negotiated (step 15).

If it is judged that the communication with the destination can be made (step 16), the image data of the copy are transmitted under the above conditions (step 17). When the connection with the destination cannot be made, it is judged whether the connection has been tried prescribed times or not (step 18). If the number of times of the trials of connection does not reach the prescribed times yet, the steps 15 and 16 are tried.

If the connection is failed even after the prescribed times of the trials, it is judged whether any other communication means exist or not (step 19). If other communication means exist, the second cheapest means is determined, and the communication means is switched to the selected one by the selecting means 7 (step 20). Thereafter, the steps 15 to 19 are repeated. If there is not any other communication means, the communication is terminated.

Figure 5:
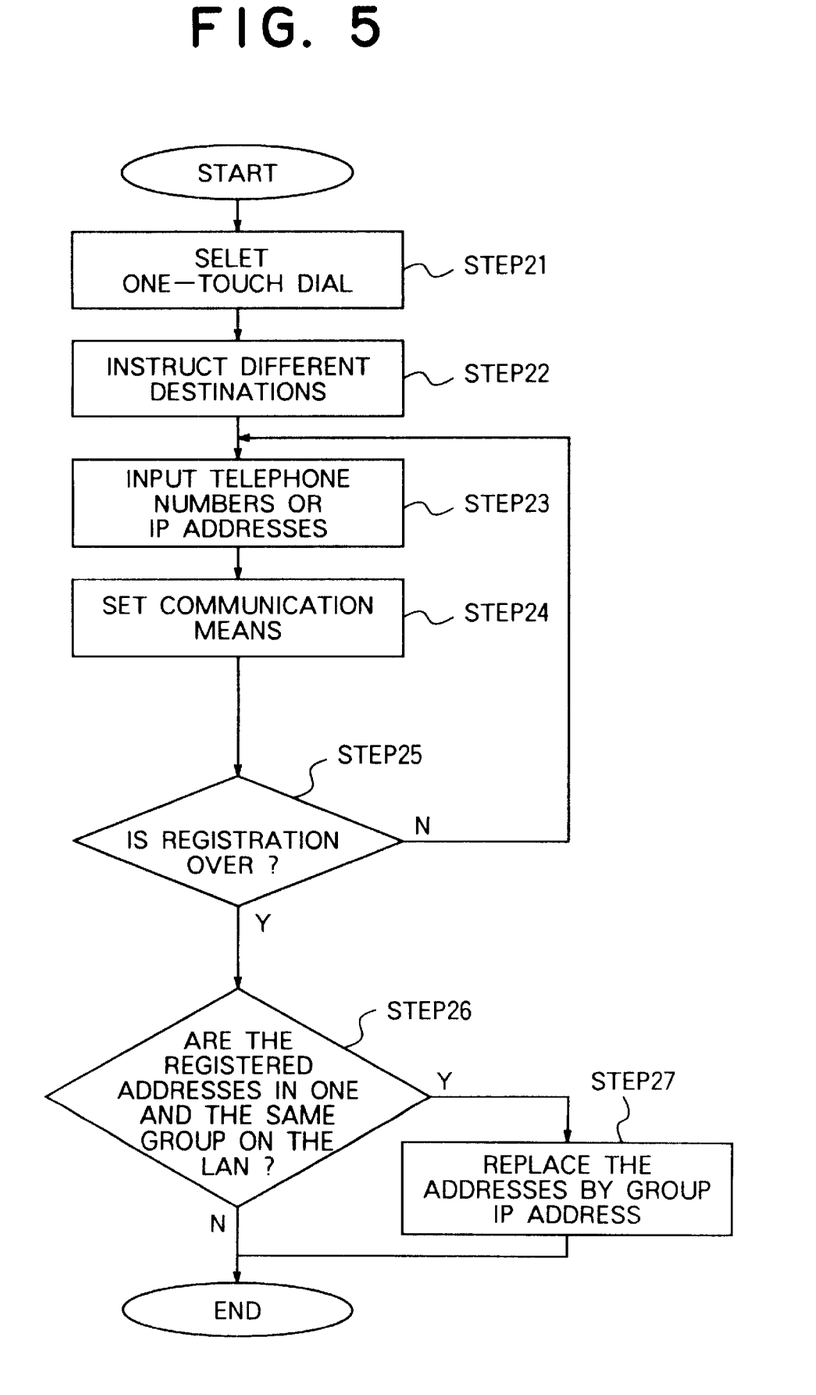
FIG. 5 is a flow chart showing the control operation of the facsimile apparatus.

Next, the case where one and the same copy is transmitted to a plurality of different destinations will be explained. As shown in FIG. 5, when it is intended to transmit one and the same copy to a plurality of different destinations, the CPU 4 designates a one-touch dial memory area to store data through the panel operation portion 1 in advance (step 21), so that the data operated by the panel operation portion 1 and inputted through a terminal P1 are stored in the designated one-touch dial memory area. Further, an instruction is given to indicate that telephone numbers and IP addresses which will be inputted now through the panel operation portion 1 are of different destinations (step 22). Then, destination telephone numbers, LAN-IP addresses, etc. are inputted (step 23). Next, a code indicating the corresponding communicated means is inputted, that is, a code is inputted to indicate which one of the communication means is suitable to the inputted destination data, among a general public line, ISDN, LAN, or the like. The CPU 4 sends these destination data to the one-touch dial memory portion 5 through the terminal P2 so that these destination data are stored in the one-touch dial memory portion 5 (step 24).

The user inputs destination data for every transmission partner, and the steps 23 and 24 are repeated till all the communication means for the destinations are registered. Then, the registration is completed (step 25).

When the registered addresses are judged to be in one and the same group on the LAN (step 26), the respective addresses are replaced by the IP address of the group (step 27). Specifically, for example, since a common group IP address (189. 28. 5. 20) is registered in the destination data stored in the memory areas No. 1, No. 3 and No. 4, these destination data are judged to be in one and the same group. Therefore, in this case, the respective addresses are replaced by the group IP address registered in the one-touch dial memory portion 5.

Figure 6:
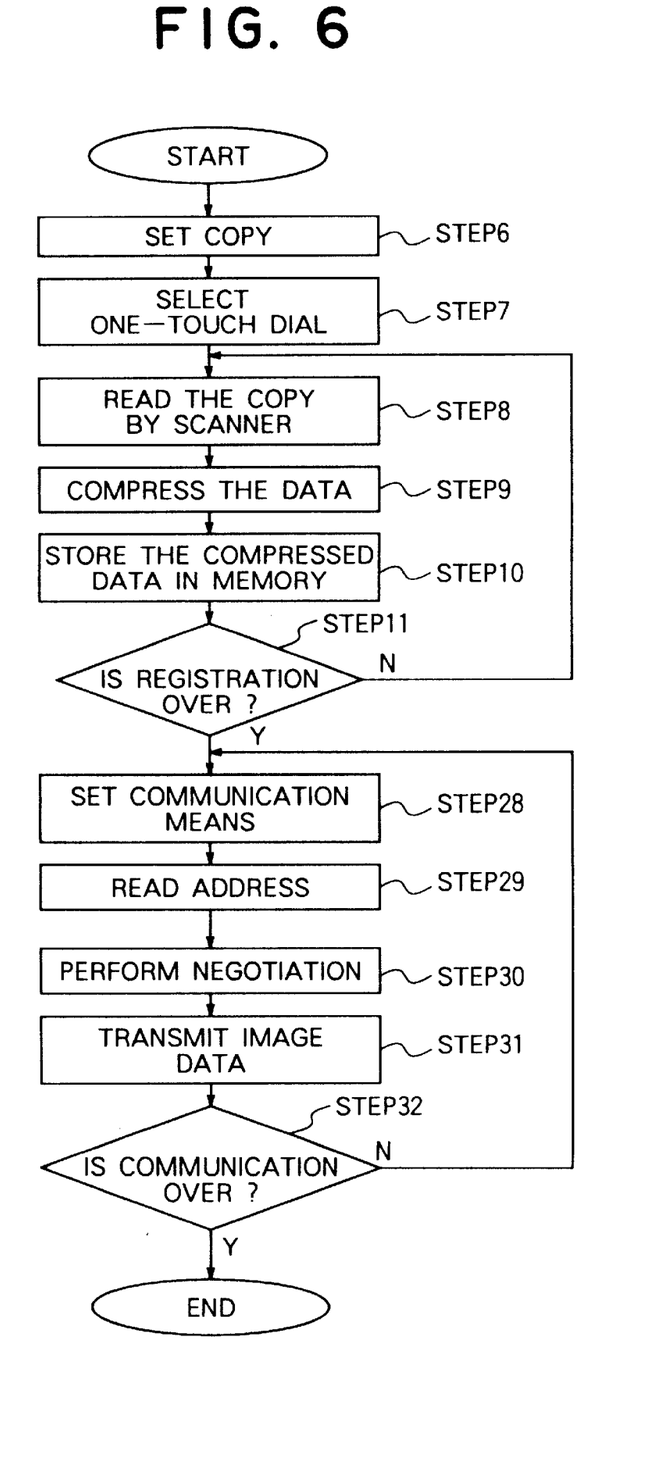
FIG. 6 is a flow chart showing the control operation of the facsimile apparatus.

Next, the user sets a copy to be sent in the scanner means 2. As shown in FIG. 6, when it is detected that the copy has been set in the scanner means 2 (step 6), the telephone numbers or IP addresses, and the information such as the destination names accompanying those telephone numbers or IP addresses, which have been stored in the steps 21 to 25 in advance, are read from the one-touch dial memory portion 5, and displayed on the display means 11. When the user operates the panel operation portion 1 and specifies one of the destinations to which the copy is to be sent (step 7), the copy reading operation is then started.

In the copy reading operation, first, a first sheet of the copy set in the scanner means 2 is fed so that image data are read therefrom (step 8), the image data are compressed and coded by means of the coding means 3 (step 9), and then, the coded data are stored in the memory portion 6 (step 10). If the copy has a plurality of pages, the next sheet is fed and image data is read out in the same manner as described above (step 8), the image data are compressed and coded (step 9), and then stored in the memory portion 6 (step 10). These processes are repeated in accordance with the number of pages of the copy to be sent (step 11).

Next, the codes which are stored in the one-touch dial memory portion 5 and which indicate communication means are read out, and a communication means to be used is determined. Assume that LAN is selected here by way of example, and the communication path is connected to the communication means selected by the selecting means 7 (step 28).

Then, the IP address of the communication destination selected in the step 7 is read from the one-touch dial memory portion 5 (step 29). The communication with the destination is tried along the communication protocol in accordance with the selected communication means. At the same time, in the case of the address replaced by the group IP address, multi-cast communication is negotiated (step 30).

Thereafter, the image data of the copy are transmitted under the conditions in accordance with the negotiation (step 31). In the case of the group IP address, the data can be transmitted to a plurality of partners at one communication. If not so (step 32), the steps 28 to 31 are repeated till communication with other registered partners is completed.

Figure 7:
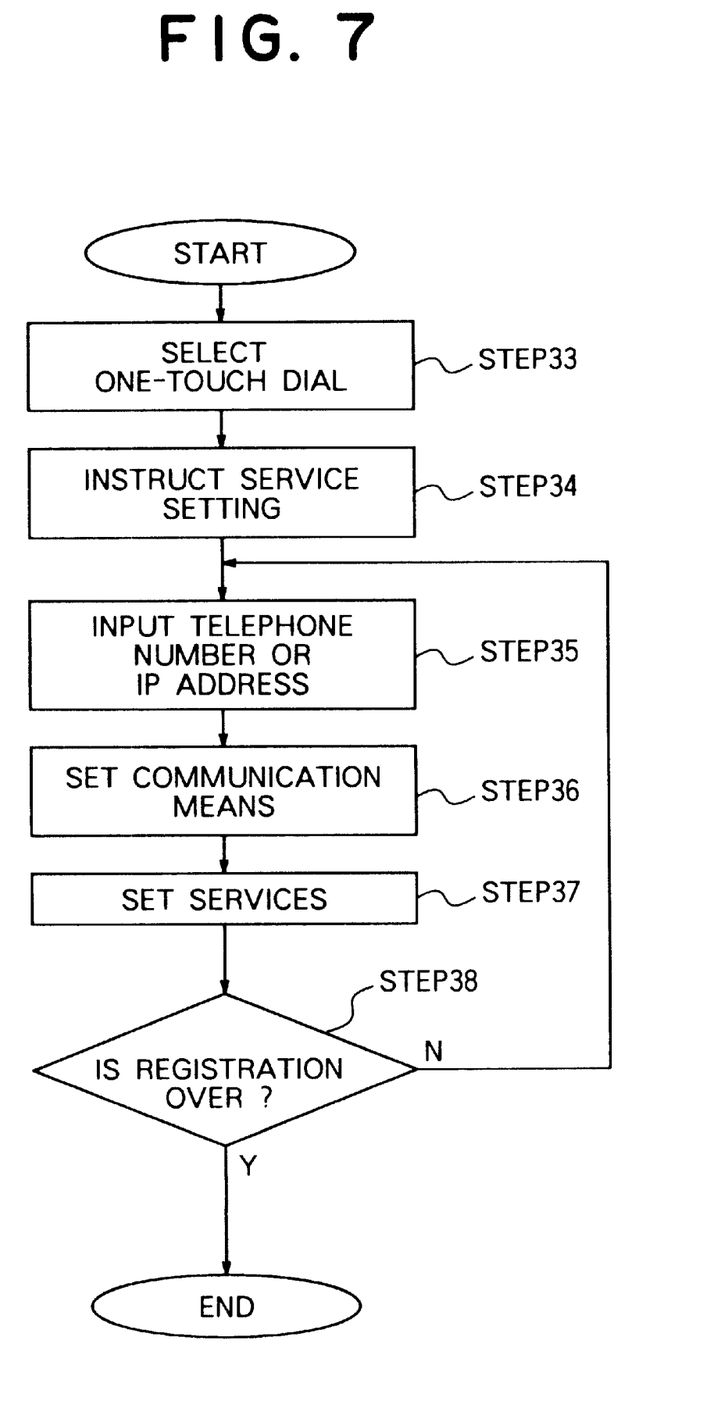
FIG. 7 is a flow chart showing the control operation of the facsimile apparatus.

In addition, as shown in FIG. 7, the CPU 4 specifies a one-touch dial memory area to store destination data through the panel operation portion 1 in advance (step 33). Further, an instruction is given so as to register a communication service for the telephone numbers and IP addresses which will be inputted now through the panel operation portion 1 (step 34). Then, the user operates the panel operation portion 1 so as to input the destination data such as destination telephone numbers, LAN-IP addresses, etc. (step 35). Next, a code indicating the corresponding communication means is inputted, that is, a code is inputted to indicate which one of the communication means is suitable to the inputted destination data, among a general public line, ISDN, LAN, or the like. The CPU 4 sends these destination data to the one-touch dial memory portion 5 through the terminal P2 so that these destination data are stored in the one-touch dial memory portion 5 (step 36).

Further, since there is a case where services on the LAN are intended to be set to one of the destinations for which the LAN is available, the user inputs information designating the services to be set in association with the IP address of the destination. The CPU 4 sends the information designating these services to the one-touch dial memory portion 5 through the terminal P2 so that these information are stored in the one-touch dial memory portion 5 (step 37). When such registration is performed with respect to a plurality of destinations, the steps 35 to 37 are repeated till all the destinations are registered (step 38).

Figure 8:
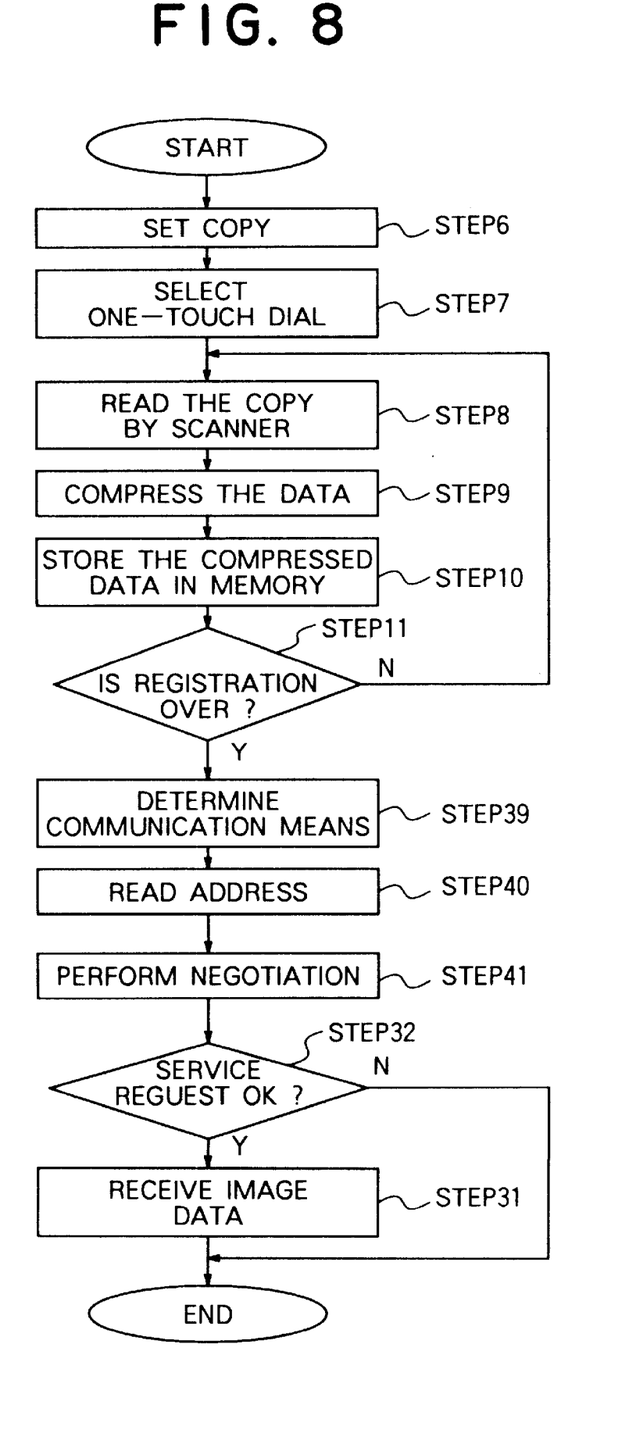
FIG. 8 is a flow chart showing the control operation of the facsimile apparatus.

Next, as shown in FIG. 8, the user sets a copy to be sent in the scanner means 2 (step 6). The telephone numbers or LAN IP addresses, and information such as the destination names accompanying these numbers or addresses, which have been stored in the steps 33 to 38 in advance, are read from the one-touch dial memory portion 5, and displayed on the display means 11. When the user operates the panel operation portion 1 to specify one of the destinations to which the copy is to be sent (step 7), the image data of the copy set in the scanner 2 are read (step 8), compressed and coded by means of the coding means 3 (step 9), and then stored in the memory means 6 (step 10). If the copy has a plurality of pages, these processes are repeated in accordance with the number of pages of the copy to be sent (step 11).

Next, the data of communication means stored in the one-touch dial memory portion 5 are read out. Assume that LAN is selected here by way of example, and by means of the selecting means 7, a communication means is determined to switch the connection to the communication means (step 39). Then, the IP address of the communication destination selected in the step 7 is read from the one-touch dial memory portion 5 (step 40). The negotiation for trying to communicate with the partner is performed along the communication protocol in accordance with the selected communication means and the registered communication service information (step 41). If the communication with the destination is judged to be possible (step 42), the communication is performed under the conditions of the negotiation. In this embodiment, image data are received from the partner (step 43). If it is impossible to communicate with the partner, the communication is terminated.

It is also possible to individually set the above-mentioned items, or it is also possible to set a plurality of items at the same time.

As has been described above, according to the facsimile apparatus of the present invention, not only it is possible to select a communication means of the cheapest communication cost by a simple operation, but also it is possible to automatically select another means of the second cheapest communication cost to make the communication possible, when the communication can not be carried out by the selected cheapest communication means.

In addition, it is possible to send one and the same copy to a plurality of communication destinations by a simple operation. Further, when the destinations belong to one and the same group, it is possible to send the copy to the plurality of destinations at one communication. Accordingly, it is possible to reduce the communication cost and the communication time.

In addition, a complicated operation for setting communication services at every communication is not necessary. Communication can be started by a simple operation if the services are registered in advance. There is a remarkable effect that it is possible to reduce the influence of errors in accordance with the circumstances of lines, and it is possible to reduce the communication time as a whole.

What is claimed is:

1. A facsimile apparatus comprising:

PSTN adaptor means for transmitting and receiving data through general public telephone lines, and LAN adaptor means for transmitting and receiving data through a LAN;

data input means for inputting destination data of communication partners;

memory means having a plurality of divided one-touch dial memory areas, said memory means for storing the destination data of the communication partners individually in each of said one-touch dial memory areas;

scanner means for inputting image data of a document;

data compressing means for compressing the image data input by said scanner means;

selecting means for selecting said divided one-touch dial memory areas of said memory means for storing the destination data therein and for selecting one or more of said divided one-touch dial memory areas for reading out the destination data therefrom to enable a communication to be sent;

first control means for making said memory means store communication means and addresses associated with said partners individually in each of said one-touch dial memory areas by means of said input means; and second control means for, when said selecting means selects plural partners to which a communication is to be sent, (i) determining whether the selected plural partners are registered in said divided one-touch dial memory areas as belonging to a same specific group on said LAN, and (ii) if the selected plural partners are determined in step (i) as belonging to said same group, automatically extracting an IP address of said group from said addresses stored in said divided one-touch dial memory areas, and transmitting the compressed image data to said IP address.

2. A facsimile apparatus comprising:

PSTN adaptor means for transmitting and receiving data through general public telephone lines;

LAN adaptor means for transmitting and receiving data through a LAN;

data input means for inputting destination data of communication partners;

memory means having a plurality of divided one-touch dial memory areas, said memory means for storing the destination data of the communication partners individually in each of said one-touch dial memory areas;

selecting means for selecting said divided one-touch dial memory areas of said memory means for storing the destination data therein and for selecting one or more of said divided one-touch dial memory areas for reading out the destination data therefrom to enable a communication to be sent;

scanner means for inputting image data of a document;

data compressing means for compressing the image data input by said scanner means;

first control means for, when said selecting means selects a partner to which a communication is to be sent, extracting from said destination data stored in said memory means information concerning services which are available for the partner, selecting a communication means in accordance with said services and transmitting the compressed image data; and second control means for, when said selecting means selects plural partners to which a communication is to be sent (i) determining whether the selected plural partners are registered in said divided one-touch dial memory areas as belonging to a same specific group on said LAN, and (ii) if the selected plural partners are determined in step (i) as belonging to the same group, automatically extracting an IP address of said same group from said addresses stored in said divided one-touch dial memory areas, and transmitting the compressed image data to said IP address.

3. A facsimile apparatus according to claim 2, further comprising:

third control means for, by means of said input means, making said memory means store, individually in each of said one-touch dial memory areas, addresses and said communication means associated with said partners and information concerning services which are available for the partners; and fourth control means for calculating a communication cost in communicating through the respective communication means when a partner to which a communication is to be sent is given by a user upon user's communication, determining the communication means of a cheapest communication cost, making said communication selecting means select the communication means having said cheapest communication cost transmitting the compressed image data, and requesting the services registered by said service storage means from said partner.

4. A facsimile apparatus, comprising:

PSTN adaptor means for transmitting and receiving data through general public telephone lines, ISDN adaptor means for transmitting and receiving data through an ISDN line;

LAN adaptor means for transmitting and receiving data through a LAN;

data input means for inputting destination data of communication partners;

memory means having a plurality of divided one-touch dial memory areas and for storing information of the partners and individual IP address and group IP address of the partners in said one-touch dial memory areas;

communication selecting means for selecting one of a plurality of communication means when communication is performed;

scanner means for inputting image data of a document;

data compression means for compressing the image data input by said scanner means;

selecting means for selecting said divided one-touch dial memory areas of said memory means for storing the destination data therein and for selecting one or more of said divided one-touch dial memory areas for reading out the destination data therefrom to enable a communication to be sent;

first control means for making said memory areas selected by said selecting means store information of communication means and addresses of the partners individually in each of said one-touch dial memory areas by means of said input means;

second control means for calculating a communication cost in communication through the respective communication means when a partner to which a communication is to be sent is specified by said selection means, determining the communication means of a cheapest communication cost, making said communication selecting means select the communication means of said cheapest communication cost, and transmitting the compressed image data; and third control means for, when said selecting means selects plural partners to which a communication is to be sent, (i) determining whether the selected plural partners are registered in said divided one-touch dial memory areas as having a same group IP address, and (ii) if the selected plural partners are determined in step (i) as having the same group IP address, automatically extracting the group IP address from said memory means, and transmitting the compressed image data to said group IP address at one communication.

* * * * *